June 4, 1935.  L. POLL ET AL  2,003,390
PLANTING MACHINE
Filed Feb. 19, 1934  4 Sheets-Sheet 1

Witness:
Geo L. Chapel

Inventors:
Louis Poll
Benjamin Poll
By Rice and Rice
Attorneys

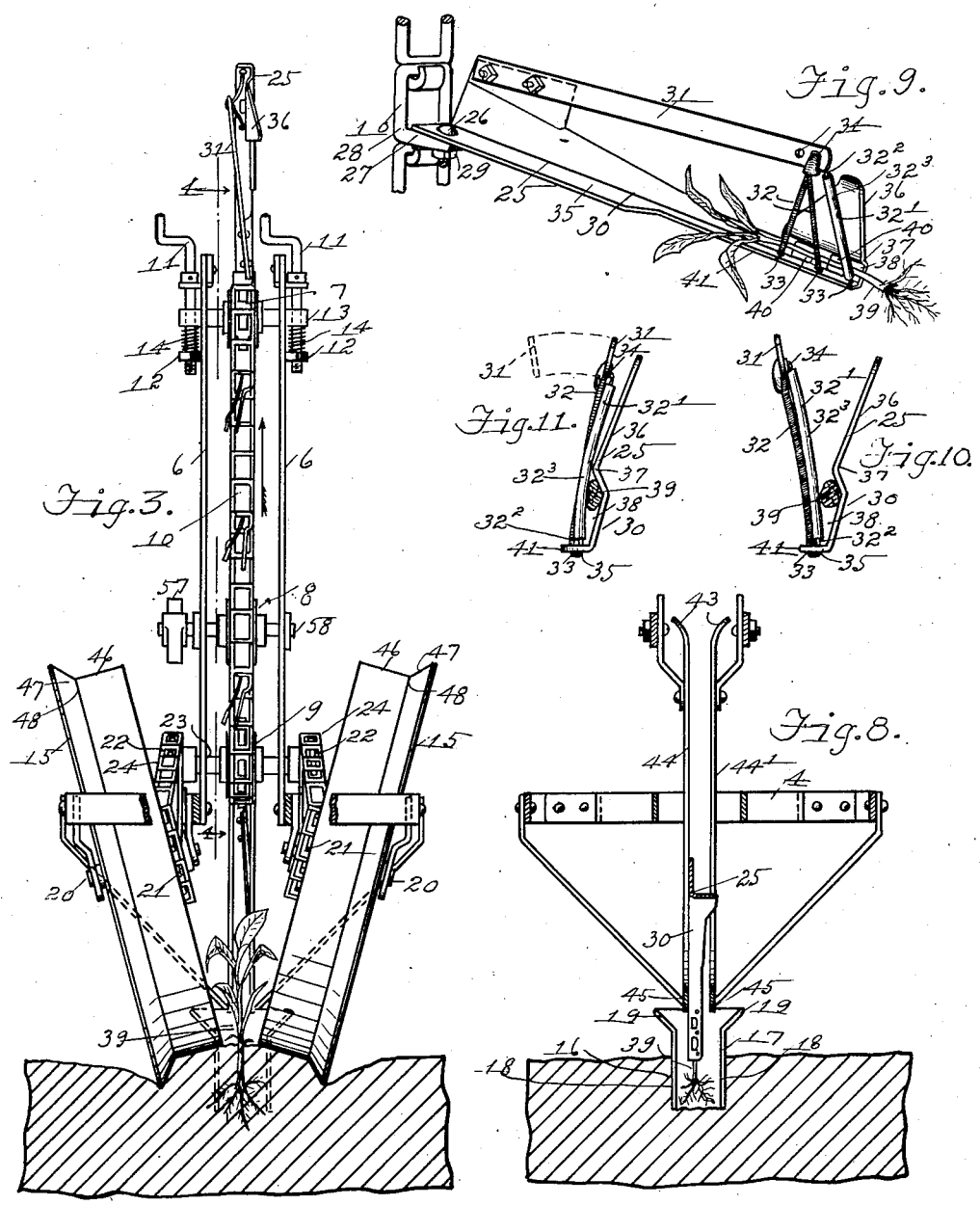

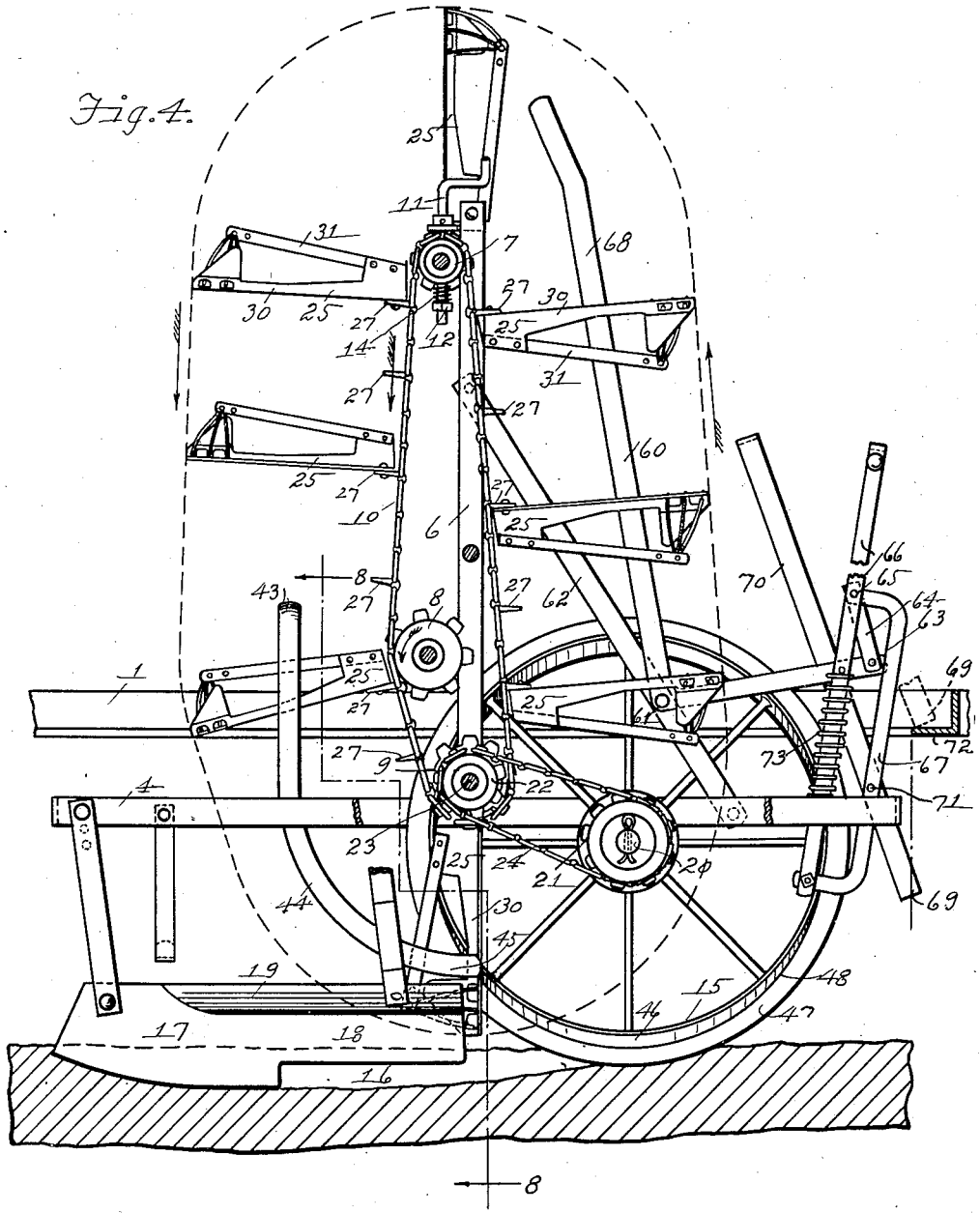

June 4, 1935.  L. POLL ET AL  2,003,390
PLANTING MACHINE
Filed Feb. 19, 1934  4 Sheets-Sheet 4
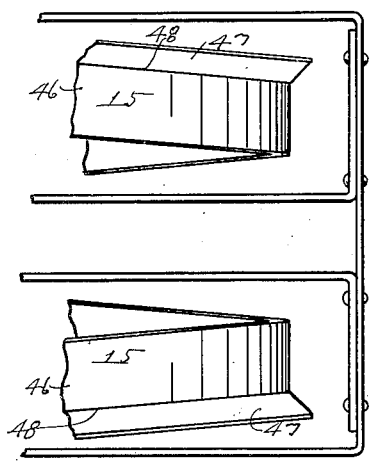
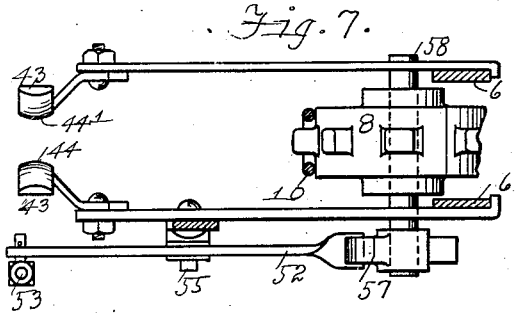
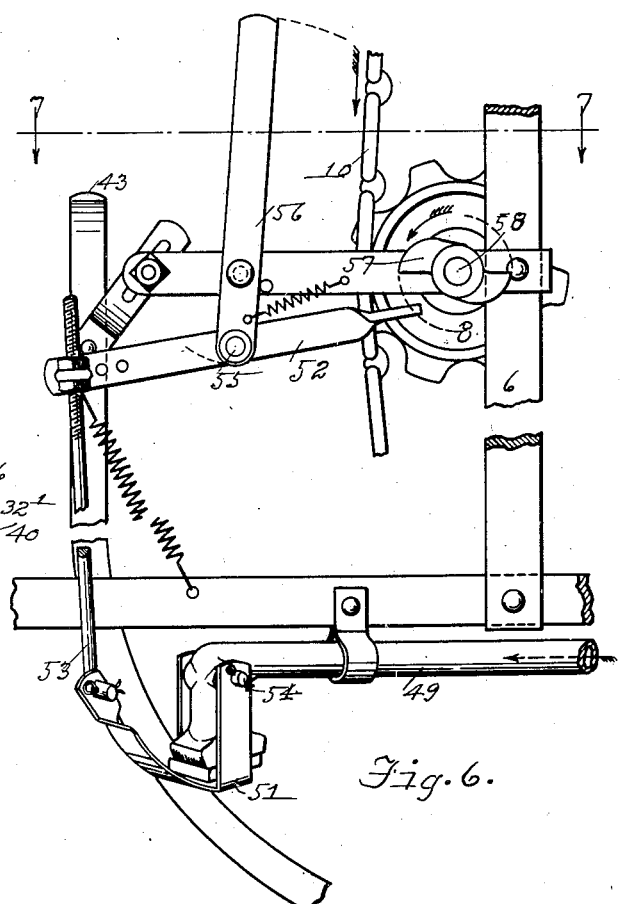
Inventors:
Louis Poll
Benjamin Poll
By Rice and Rice,
Attorneys Patented June 4, 1935

2,003,390

UNITED STATES PATENT OFFICE 2,003,390

PLANTING MACHINE

Louis Poll, Hamilton, and Benjamin Poll, Holland, Mich.

Application February 19, 1934, Serial No. 711,872

3 Claims. (Cl. 111—3)

The present invention relates to machines for setting plants in the ground and packing the earth about their roots, being machines of the type shown in Patent No. 1,888,143, issued November 15, 1932, to Louis Poll (one of the applicants herein), but improved thereover in certain respects including the following objects of the present invention, viz.: to provide in such a machine plant holders carried by a belt; improved plant holder units; improved means for mounting such units; improved means for releasably holding the plants in such units; improved means for setting the plants in a furrow; and any other and more specific objects hereinafter appearing.

Such objects are attained by, and the invention finds preferable embodiment in, the machine and devices particularly described in the body of this specification and illustrated by the accompanying drawings, in which:

Figure 3 is an elevational rear view (enlarged) of middle portions of the same, rearward portions being broken away;

Figure 4 is an elevational left hand-side view of certain of said middle portions, certain parts being sectioned on line 4—4 of Figure 3;

Figure 5 is a top plan view of parts of the same;

Figure 6 is an elevational left hand-side view (further enlarged) of certain parts shown in Figure 4 with additional parts;

Figure 7 is a top plan view of certain parts shown in Figure 6, partially sectioned on line 7—7 of Figure 6;

Figure 8 is an elevational rear view of certain parts shown in Figure 4 partially sectioned on line 8—8 of Figure 4;

Figure 9 is a view in perspective of a plant holder of the machine with a plant held therein;

Figure 10 is an end view thereof showing in section the plant seated therein;

Figure 11 is a like view of the holder but showing the plant seated and clamped therein;

Figure 12 is a view in perspective of such a plant holder but illustrating a modified construction thereof.

Figure 1:
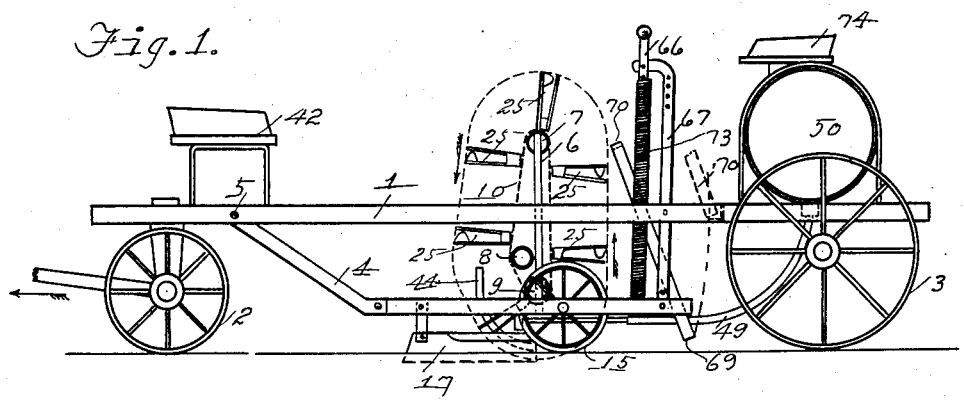
Figure 1 is an elevational left hand-side view of a planting machine.
Figure 2:
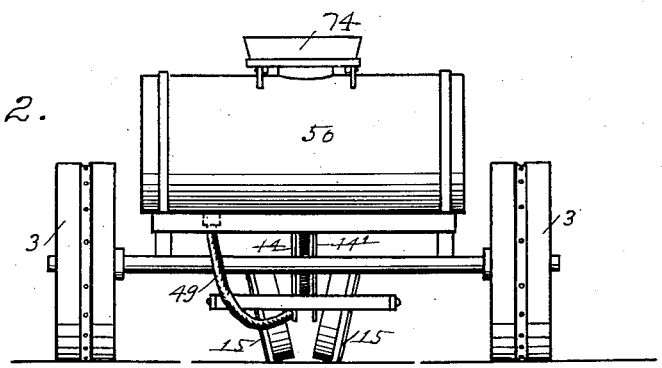
Figure 2 is an elevational rear view thereof.

In these drawings is shown a machine for setting small plants, such as onion and strawberry plants and the like, in a furrow and packing the earth about their roots, said machine comprising a main frame 1 supported by forward vehicle wheels 2 and rearward vehicle wheels 3, and a subframe 4 pivotally mounted at 5 on the main frame so as to be raised and lowered relatively thereto to vary the planting depth of the plants, this subframe carrying the planting or setting mechanism. A vertical post comprising parallel members 6 is carried by the subframe, on which post are rotatably mounted vertically spaced sprocket wheels 7, 8, 9 whose axes extend horizontally and transversely of the sub frame. A carrier, the belt or sprocket chain 10, is mounted on these wheels and may be tightened by turning the bolts 11 journalled in brackets on the post members 6 and threaded in the non-turning nuts 12 and passing freely through the axle member 13 on which wheel 7 turns, springs 14 between said nuts and axle member serving to cushion the downward movement of said member.

A pair of earth-packing wheels 15 are disposed on the opposite sides of the furrow 16 in which the plants are set which furrow is formed in the forward travel of the machine by the plow shoe 17 having opposite sides 18 with diverging upper portions 19. The spindle axles 20 of these packing wheels are inclined so that the wheels' sides are upwardly divergent as seen in Figure 3.

Each of said packing wheels has a sprocket wheel 21 on which and on the sprocket wheels 22 on the rotatable axle 23 of the sprocket wheel 9 are carried sprocket chains 24, so said wheel 9 and the sprocket chain 10 are driven in the direction indicated in Figures 1 and 4 by the rotation of the packing wheels 15 as the machine travels forwardly over the field.

Plant holders 25 are spacedly mounted on the chain or carrier 10 and extend outwardly therefrom as particularly well seen in Figure 4. These holders are desirably mounted as detachable units on the chain (for ready replacement or repairing) as by threaded bolts 26 passing therethrough and through arms 27 of some of the links 28 of said chain as shown in Figure 9, these bolts having nuts 29. Said plant holders comprise a lower main part or arm 30 and an upper laterally-flexible spring arm or part 31, with flexible ligaments 32, 32[1] desirably elastic extending between anchorages 33 spaced in the longitudinal direction of the main arm 30 and an anchorage or anchorages 34 on the spring arm 31, such anchorages being desirably openings in said arms through which the ligaments extend.

The main arm 30 has a bottom or flange 35 and a side or flange 36 extending upwardly therefrom in upwardly-diverging relation with the spring arm 31 in said spring arm's normal position particularly well seen in Figure 10. This side 36 has a medial portion or rib 37 extending toward the ligaments and forming a pocket or a seat portion 38 below said middle portion adapted to receive and releasably hold the stalk of the plant 39 in which position it is lightly clamped by the ligaments (in spanning relation with the side 36), when (as seen in Figure 11) the arm is sprung (as hereinafter explained) toward said side 36 of the main arm. The bottom flange 35 or side flange 36 adjacent thereto is provided with openings 40 for discharging dirt which may be carried into the holder with the plant, and the edge 41 of said bottom flange extends outwardly from the ligaments (as shown in Figures 10 and 11) to prevent abrasion or injury which might otherwise result to these ligaments in the movement of the holders along the cam as hereinafter explained.

The ligament $32^1$ comprises an inner cord $32^2$ like the ligaments 32 and a surrounding rubber tube $32^3$ to prevent injury to the fingers of the operator while inserting the plant into the holder.

As shown, these plant holders are so mounted on chain 10 that the ligaments are alternately toward the opposite sides of the machine; that is, in one of the holders the ligaments are toward the right hand side of the machine and the ligaments of the next holder are toward the left hand side of the machine and so on, there being thus two sets of holders.

This arrangement facilitates the insertion of plants into one set of holders by one operator, and into the other set by another operator, these operators sitting side by side on the rearwardly facing seat 42; and it will be seen that by mounting the holders on the chain 10 instead of on a rotating disk or the like (as in said Patent 1,888,143) a greater number of such holders are accessible at one time for inserting plants thereinto.

As the chain 10 is driven in the indicated direction the operator inserts a plant (with its root outwardly) between the relatively inclined side 36 of main arm 30 and the ligaments, and presses it downwardly below said side's middle portion or rib 37 and into the pocket or seat 38 where it is lightly pressed in held position by the ligaments as shown in Figure 10. As each plant holder is carried by the chain's travel to a position wherein its spring arm 31 engages the upper end 43 of the curved plate or cam member 44 for one set of holders or $44^1$ for the other set, this arm is thereby sprung laterally toward the main arm 30 thus lightly but sufficiently and more firmly clamping the plant yieldingly in the holder as seen in Figure 11 so that the plant may be more surely carried between the opposite sides 19 of the plow shoe 17 and more accurately positioned vertically in the furrow 16. When the plant holder passes beyond the lower end 45 of said plate or cam member, the arm 31 springs back to normal position (Figure 10) thus releasing the plant from such clamping engagement whereupon it is immediately planted or fixed firmly in the ground by the wheels 15 which pack the earth about its root as indicated in Figure 3 and the furrow is thus closed.

These packing wheels 15 have peripheral portions 46, 47 meeting at a sharp angle 48 (Figure 3) thus acting most efficiently to close the furrow and press the soil about the plants' roots, inasmuch as the inclined flange portions 47 press the soil inwardly while the portions 46 press the same downwardly.

In Figure 12 a modified construction of the plant holder $25^1$ is shown wherein the spring arm $31^1$ being round is flexible and resilient in all lateral directions.

To set the plant sufficiently firmly in the furrow so that it may not be disturbed or moved from its set position before the packing wheels 15 more firmly set it, a stream of water is discharged thereon through a conduit 49 leading from the tank 50. This pipe has a terminal valve indicated at 51 opened intermittently by a lever 52 connected by rod 53 with the valve which is pivoted at 54, this lever fulcrumed at 55 on the hand lever 56 being swung or tripped by an arm or extension 57 on the rotating shaft 58 of sprocket wheel 8.

Means are provided for raising and lowering the subframe 4 to vary the depth of the furrow and the planting depth of the plants. In the shown construction such means include a hand-operated bell crank lever 60 fulcrumed at 61 on the brace rod 62 fastened to the subframe 4 and the post 6, its short arm being pivoted at 63 to a link 64 pivoted at 65 to the bar 66 having a parallel bar 67. When the long handle arm 68 of said bell crank lever is pressed forwardly far enough the bars 66, 67 are thereby raised sufficiently to carry the lower end 69 of bar 70 pivoted at 71 on the bar 67 is raised to the position shown in dotted lines in Figure 4 so that said end rests on the ledge 72 of the main frame. When the upper arm of the lever bar 70 is drawn rearwardly its lower end 69 is moved off of said ledge thus permitting the subframe to fall, the parts being held from rattling movement by the spring 73 pressing between the subframe and the bell crank lever 60.

Any means may be employed to travel the machine over the ground. In the shown construction the machine is horse drawn, the driver sitting on the rear seat 74.

The invention being intended to be pointed out in the claims, is not to be limited to or by details of construction of the particular embodiment thereof illustrated by the drawings or hereinbefore described.

We claim:

1. In a planting machine: a carrier having a circuitous movement; a plurality of plant holders mounted in spaced relation on the carrier each plant holder comprising a pair of parallelly disposed arms extending at right angles to the carrier's direction of movement, one of said arms being an elongated leaf spring and the other arm having an open pocket adapted to receive a plant; a flexible member secured at its ends to said arms respectively and adapted to span and close the mouth of the pocket in one relative position of the arms to retain a plant placed in the pocket; and means in the path of the carrier's movement for springing the first-mentioned arm toward the pocket for closing the same and yieldingly holding said plant therein.

2. In a planting machine: a carrier having a circuitous movement; a plurality of plant holders mounted in spaced relation on the carrier each plant holder comprising a pair of parallelly disposed arms extending at right angles to the carrier's direction of movement, one of said arms being an elongated leaf spring and the other arm having an open pocket adapted to receive a plant; a flexible member secured at its ends to said arms respectively and adapted to span and close the mouth of the pocket in one relative position of the arms to retain a plant placed in the pocket; and means in the path of the carrier's movement for springing the first-mentioned arm toward the pocket for closing the same and yieldingly holding said plant therein, said flexible member comprising a flexible inner ligament and a flexible tube surrounding the same.

3. In a planting machine: a carrier having a circuitous movement; a plurality of plant holders mounted in spaced relation on the carrier each plant holder comprising a pair of parallelly disposed arms extending at right angles to the carrier's direction of movement, one of said arms being an elongated leaf spring and the other arm having an upwardly extending side portion provided with an open pocket adapted to receive a plant, a laterally extending flange portion below the pocket and dirt-discharging openings in the bottom of the holder; a flexible member secured at its ends to the first-mentioned arm and to said flange respectively and adapted to span and close the mouth of the pocket in one relative position of the arms to retain a plant placed in the pocket; and means in the path of the carrier's movement for springing the first-mentioned arm toward the pocket for closing the same and yieldingly holding said plant therein.

LOUIS POLL.
BENJAMIN POLL.